US012676881B2

(12) United States Patent
Shafet et al.

(10) Patent No.: US 12,676,881 B2
(45) Date of Patent: Jul. 7, 2026

(54) PREDICTING ONLINE ELECTRONIC ATTACKS BASED ON OTHER ATTACKS

(71) Applicant: PayPal, Inc., San Jose, CA (US)

(72) Inventors: Yuri Shafet, Beer Sheva (IL); Bradley Wardman, Phoenix, AZ (US); Ilya Chernyakov, Givat Shmuel (IL)

(73) Assignee: PAYPAL, INC., San Jose, CA (US)

( * ) Notice: Subject to any disclaimer, the term of this patent is extended or adjusted under 35 U.S.C. 154(b) by 190 days.

(21) Appl. No.: 18/424,119

(22) Filed: Jan. 26, 2024

(65) Prior Publication Data

US 2024/0250982 A1      Jul. 25, 2024

Related U.S. Application Data

(63) Continuation of application No. 17/527,579, filed on Nov. 16, 2021, now Pat. No. 11,916,954, which is a
(Continued)

(51) Int. Cl.
*H04L 9/40* (2022.01)
*G06F 16/953* (2019.01)
*G06Q 20/08* (2012.01)

(52) U.S. Cl.
CPC ........ *H04L 63/1441* (2013.01); *G06F 16/953* (2019.01); *G06Q 20/085* (2013.01); *H04L 63/1416* (2013.01); *H04L 63/1433* (2013.01)

(58) Field of Classification Search
CPC ............. H04L 63/1441; H04L 63/1416; H04L 63/1433; G06F 16/953; G06F 16/9536; G06Q 20/085; G06Q 20/4016
See application file for complete search history.

(56) References Cited

U.S. PATENT DOCUMENTS 8,423,543 B2 * 4/2013 Doliov ................. G06Q 10/067
707/751
8,726,379 B1 5/2014 Stiansen et al.
(Continued)

FOREIGN PATENT DOCUMENTS

CN        117081808 A  * 11/2023   ......... H04L 63/1416
EP          3767506 A1 *  1/2021   ......... H04L 63/1416
(Continued)

OTHER PUBLICATIONS

Agarwal S., et al., "A Fast Fraud Detection Approach using Clustering Based Method", Journal of Basic and Applied Engineering Research, vol. 1(10), Retrieved from Internet URL: http://www. krishisanskriti.org/jbaer.html, Oct. 2014, 5 pages.
(Continued)

*Primary Examiner* — Sarah Su
(74) *Attorney, Agent, or Firm* — HAYNES AND BOONE, LLP

(57)        ABSTRACT

An indication is received that a first online platform has undergone/is undergoing a first electronic attack made by one or more actors engaged in online malicious actions with the first online platform. Responsive to the indication of the first electronic attack, one or more vulnerability characteristics of the first online platform are determined, where the vulnerability characteristics are associated with the first electronic attack. A plurality of other online platforms are analyzed to identify a second online platform that shares at least one of the vulnerability characteristics with the first online platform. Based on the determining and/or the analyzing, the second online platform is predicted to be a potential target for a second electronic attack having an attack vector in common with the first electronic attack that corresponds to the shared vulnerability characteristics. An
(Continued)

action is performed to mitigate potential damage of the second electronic attack.

20 Claims, 6 Drawing Sheets

Related U.S. Application Data continuation of application No. 16/233,961, filed on Dec. 27, 2018, now Pat. No. 11,178,169.

(56) References Cited

U.S. PATENT DOCUMENTS

| | | | |
|---|---|---|---|
| 9,680,866 B2 * | 6/2017 | Baddour | G06F 16/951 |
| 9,948,663 B1 | 4/2018 | Wang et al. | |
| 10,432,657 B2 * | 10/2019 | Pham | H04L 63/14 |
| 10,460,306 B1 * | 10/2019 | Ramos | G06Q 20/405 |
| 10,567,405 B1 * | 2/2020 | Aziz | H04L 63/1425 |
| 11,178,169 B2 | 11/2021 | Shafet et al. | |
| 2005/0141498 A1 | 6/2005 | Cam Winget et al. | |
| 2007/0226796 A1 * | 9/2007 | Gilbert | G06F 21/577 |
| | | | 726/25 |
| 2008/0005555 A1 | 1/2008 | Lotem et al. | |
| 2009/0307049 A1 | 12/2009 | Elliott, Jr. et al. | |
| 2010/0095375 A1 * | 4/2010 | Krishnamurthy | H04L 63/1433 |
| | | | 707/E17.108 |
| 2012/0011588 A1 | 1/2012 | Milener et al. | |
| 2013/0097710 A1 | 4/2013 | Basavapatna et al. | |
| 2013/0226485 A1 | 8/2013 | Pietrowicz et al. | |
| 2013/0340082 A1 | 12/2013 | Shanley | |
| 2014/0058763 A1 | 2/2014 | Zizzamia et al. | |
| 2014/0137250 A1 | 5/2014 | Lee et al. | |
| 2014/0365377 A1 | 12/2014 | Salama et al. | |
| 2016/0094551 A1 | 3/2016 | Sugihara et al. | |
| 2016/0248800 A1 | 8/2016 | Ng et al. | |
| 2016/0307201 A1 | 10/2016 | Turgeman et al. | |
| 2017/0034023 A1 | 2/2017 | Nickolov et al. | |
| 2017/0132636 A1 | 5/2017 | Caldera | |
| 2017/0180318 A1 * | 6/2017 | Lutas | H04L 63/14 |
| 2017/0237766 A1 * | 8/2017 | Mattson | G06F 21/568 |
| | | | 726/23 |
| 2017/0270428 A1 | 9/2017 | Zoldi et al. | |
| 2017/0270526 A1 | 9/2017 | Fitzgerald | |
| 2018/0069875 A1 * | 3/2018 | Ben Ezra | H04L 63/1416 |
| 2018/0130061 A1 | 5/2018 | Caldera | |
| 2018/0234435 A1 | 8/2018 | Cohen et al. | |
| 2018/0375886 A1 | 12/2018 | Kirti et al. | |
| 2019/0058736 A1 * | 2/2019 | Stupak | H04L 63/20 |
| 2019/0251251 A1 | 8/2019 | Carson | |
| 2019/0334942 A1 * | 10/2019 | Wicker | G06F 16/288 |
| 2019/0342183 A1 | 11/2019 | Nunna et al. | |
| 2020/0076831 A1 | 3/2020 | Baughman et al. | |
| 2020/0092326 A1 | 3/2020 | Prakash et al. | |
| 2020/0120113 A1 * | 4/2020 | Burgis | H04L 63/1416 |
| 2020/0252428 A1 | 8/2020 | Gardezi et al. | |
| 2020/0264859 A1 | 8/2020 | Jones et al. | |
| 2020/0311790 A1 | 10/2020 | Keren | |
| 2020/0336498 A1 | 10/2020 | Cheng et al. | |
| 2020/0358798 A1 | 11/2020 | Maylor et al. | |
| 2020/0389480 A1 | 12/2020 | Nunes et al. | |
| 2021/0182405 A1 | 6/2021 | Yamamoto et al. | |
| 2021/0398146 A1 * | 12/2021 | Ivanov | H04L 63/1416 |
| 2022/0086184 A1 * | 3/2022 | Pham | H04L 63/1408 |
| 2024/0340313 A1 * | 10/2024 | Guez | G06V 30/18143 |
| 2024/0427879 A1 * | 12/2024 | Bulut | G06F 21/552 |

FOREIGN PATENT DOCUMENTS

| | | | | |
|---|---|---|---|---|
| GB | 2593508 A | 9/2021 | | |
| WO | WO-2014206223 A1 * | 12/2014 | | H04L 67/02 |
| WO | WO-2016028442 A1 * | 2/2016 | | G06F 16/9535 |
| WO | WO-2017006268 A1 * | 1/2017 | | G06F 21/32 |
| WO | 2019169486 A1 | 9/2019 | | |

OTHER PUBLICATIONS

Lesot M.J., et al., "Credit-Card Fraud Profiling Using a Hybrid Incremental Clustering Methodology", The 6th International Conference on Scalable Uncertainty Management, Retrieved from Internet URL: https://hal.archives-ouvertes.fr/hal-01282307, Sep. 2012, 13 pages.

Sabau A., "Survey of Clustering based Financial Fraud Detection Research", Informatica Economica, Jan. 2012, vol. 16(1), 14 pages.

Vadoodparast M., et al., "Fraudulent Electronic Transaction Detection using Dynamic KDA Model", International Journal of Computer Science and Information Security, Feb. 2015, vol. 13(2), 10 pages.

Vaishali., "Fraud Detection in Credit Card by Clustering Approach", International Journal of Computer Applications (0975-8887), Jul. 2014, vol. 98(3), Retrieved from Internet URL: www.ijcaonline.org, 4 pages.

* cited by examiner

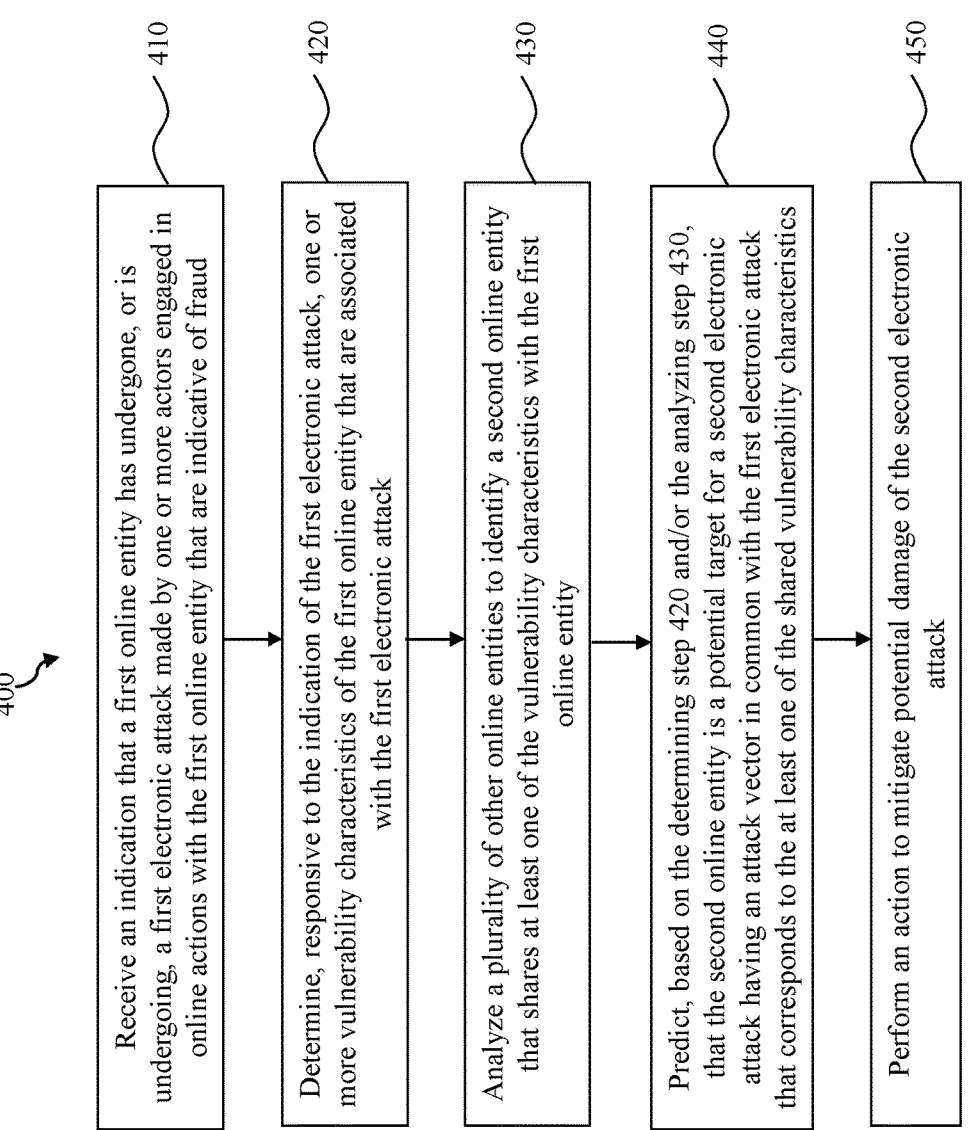

400

Receive an indication that a first online entity has undergone, or is undergoing, a first electronic attack made by one or more actors engaged in online actions with the first online entity that are indicative of fraud — 410

Determine, responsive to the indication of the first electronic attack, one or more vulnerability characteristics of the first online entity that are associated with the first electronic attack — 420

Analyze a plurality of other online entities to identify a second online entity that shares at least one of the vulnerability characteristics with the first online entity — 430

Predict, based on the determining step 420 and/or the analyzing step 430, that the second online entity is a potential target for a second electronic attack having an attack vector in common with the first electronic attack that corresponds to the at least one of the shared vulnerability characteristics — 440

Perform an action to mitigate potential damage of the second electronic attack — 450

Fig. 4

PREDICTING ONLINE ELECTRONIC ATTACKS BASED ON OTHER ATTACKS

CROSS REFERENCE TO RELATED APPLICATIONS

The present application claims priority to and is a continuation of U.S. application Ser. No. 17/527,579, filed Nov. 16, 2021, which claims priority to and is a continuation of U.S. application Ser. No. 16/233,961, filed Dec. 27, 2018, issued on Nov. 16, 2021 as U.S. Pat. No. 11,178,169, which is incorporated by reference it its entirety.

BACKGROUND

Technical Field

The present disclosure generally relates to computer security, and more particularly, to predicting potential electronic attacks on networked computer systems.

Related Art

Rapid advances have been made in the past several decades in the fields of computer technology and telecommunications. These advances have led to more and more operations being conducted online, which has attracted the attention of malicious actors. Computer security breaches perpetrated against online entities can be costly, and thus it is important to predict future occurrence of attacks, so that preventative or remedial measures can be taken. However, conventional attack detection and prevention systems are deficient in being able to accurately predict which online computer systems are likely future attack targets, even in view of information about past victims of online attacks.

BRIEF DESCRIPTION OF THE DRAWINGS

FIG. 4 is a flowchart illustrating a method according to various aspects of the present disclosure.

DETAILED DESCRIPTION

Figure 1:
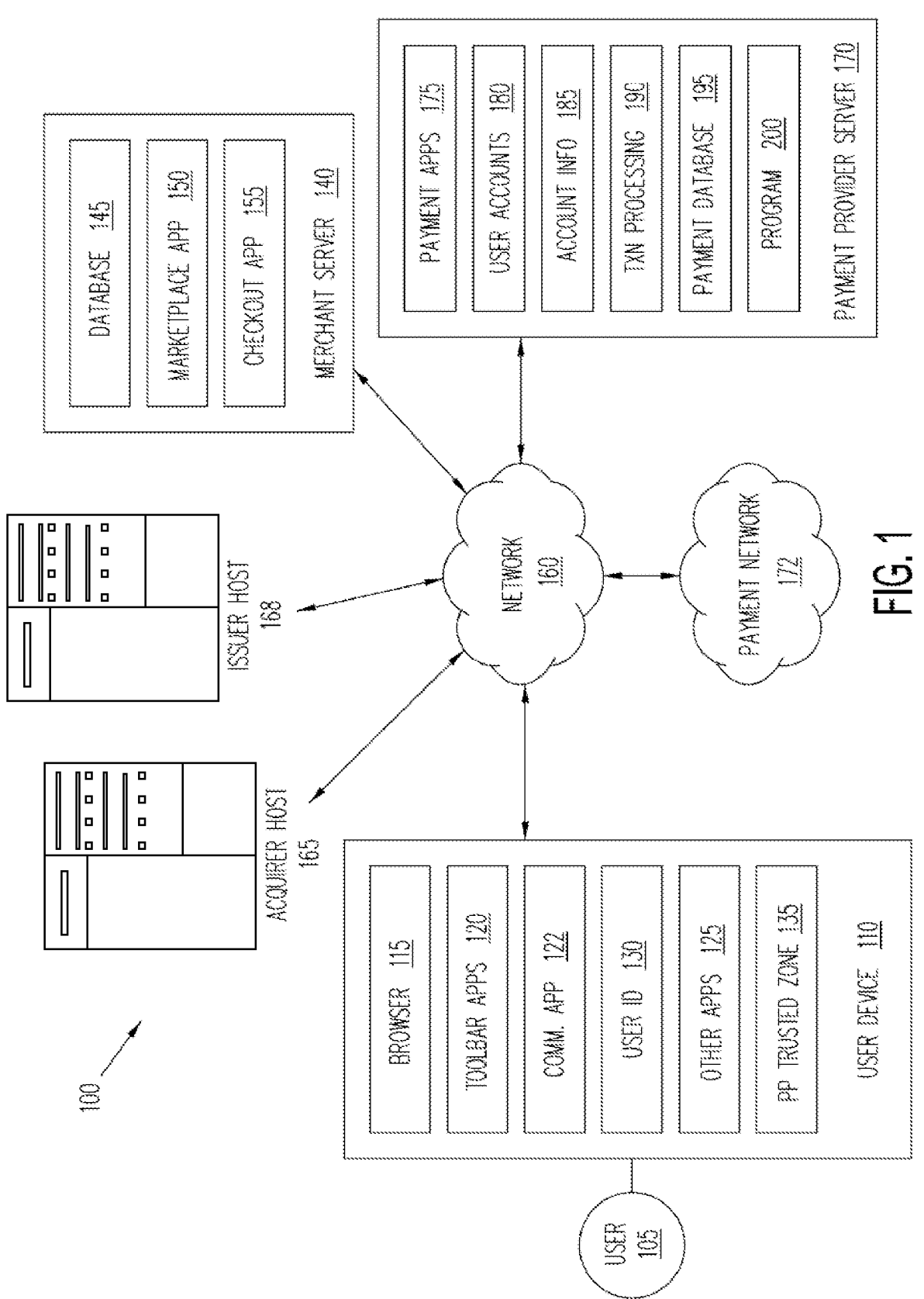
FIG. 1 is a simplified block diagram of a networked system according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic activities become increasingly more prevalent. For example, more and more people are using the Internet to perform various daily tasks such as banking, buying goods/services, consuming media, paying bills, etc. However, the popularity of online transactions has also led to an increasing number of fraudulent attacks focused on online entities, such as online merchants. For example, a fraudster with malicious intent-such as a carder (e.g., traffickers of credit cards, bank accounts, or other user personal information online)—may discover one or more vulnerabilities of a particular online merchant (e.g., a bug, a weakness, a weakness in the payment method itself, or a security loophole in the merchant's website). Examples of these vulnerabilities are described in more detail below. After discovering such vulnerabilities, the fraudster may search other online merchants that share certain vulnerabilities with that particular online merchant. The fraudster may then attack these other online merchants by exploiting the same vulnerabilities in a short amount of time, in order to maximize its illicit profit and reduce the amount of effort to develop exploits for new vulnerabilities. Unfortunately, conventional fraud identification and/or prevention systems have not devised a satisfactory solution to address this problem.

The present disclosure is directed to systems and methods of predicting the next vector of merchant attacks based on vulnerability characteristics that these merchants share with online merchants who have been victims of electronic attacks (which may be concluded or currently ongoing). For example, a "relative closeness" metric (e.g., as an example of the vulnerability characteristics) can be defined between various online merchants based on features of the merchant. In various embodiments, the "relative closeness" metric may include features such as: distance in search engine queries (e.g. closeness in rank from one result to other results based on a particular search term), similarities in payment types or electronic shopping cart technology, similarities in types, amounts, or prices of goods or services offered, presence (or the lack thereof) of security features implemented on the merchant websites, pointers (e.g. hyperlinks) from one merchant's website that are linked to the website of another merchant, similarities in size, including entity size and sales volume, etc. The closer a particular merchant is to another merchant who has already been a victim of an electronic attack (e.g., the more shared vulnerability characteristics the merchants have, particularly in view of a recent attack that takes advantage of those characteristics), the more likely that particular merchant may be a victim of the same or similar type of electronic attack. As such, the present disclosure describes how to perform mitigating actions, for example by sending warnings to the merchant of a high likelihood of a potential attack, or by temporarily denying transactions on the merchant's behalf until receiving confirmation that the merchant's vulnerabilities have been fixed.

As summarized above and discussed in more detail below, the present disclosure is integrally tied to specific technology environments (e.g., fraud detection prevention with respect to online transactions). The present disclosure also improves the functionality of a computer at least part via the implementation and execution of a program (e.g., JavaScript) to easily and effectively predict potential fraud. The various aspects of the present disclosure will be discussed below in more detail with reference to FIGS. 1-6.

FIG. 1 is a block diagram of a networked system suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or another suitable server-based OS. It can be appreciated that the servers illustrated in FIG. 1 may be deployed in other ways and that the operations performed, and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PAYPAL™, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and/or services.

Still referring to FIG. 1, the user device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications 125 to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In conjunction with user identifiers 130, user device 110 may also include a trusted zone 135 owned or provisioned by the payment service provider with agreement from a device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider, which includes communication of data or information needed to complete the request, such as funding source information.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, the payment provider server 170 may also include a program 200. The program 200 is configured to predict which merchants are likely targets for potential electronic attacks. For example, suppose that the merchant server 140 is experiencing (or has experienced) an electronic attack. The electronic attack may be a carding attack. A carding attack may include an attack where a carder tests a large number of compromised credit cards for a small transaction amount (e.g., 1 cent), or it could be a person testing a card number with a number of CVV2s to try to find the right number, or where someone attempts to run through a BIN number range to find all credit card numbers for a BIN. The electronic attack may also include a credential stuffing attack, for example an attack involving an automated injection of compromised username/password pairs in order to fraudulently gain access to user accounts. The electronic attack may be made by one or more actors that are purportedly engaged in an online action with the merchant server 140, but the online actions are indicative of fraud.

As a victim of such an attack, the merchant server 140 may report the attack to the payment provider server 170, to the acquirer host 165, the issuer host 168, and/or another party. The program 200 may communicate with the merchant server 140 and/or with the acquirer host 165 and/or the issuer host 168 to receive an indication of the attack. The program 200 then determines one or more vulnerability characteristics of the merchant server 140 that are associated with the attack. As examples, the vulnerability characteristics may include, but are not limited to: a particular type of payment accepted by the merchant server 140, a particular type or amount of goods or services offered by the merchant server 140, an average price of good or services offered by the merchant server 140, the presence (or the lack thereof) of particular security features implemented on a website of the merchant server 140, etc.

Thereafter, the program 200 may analyze a plurality of other merchants to determine one or more merchants that share at least one of the vulnerability characteristic with the merchant server 140. For example, prior to the initial attack against the merchant server 140, the payment provider server 170 may have already gathered profile information about a plurality of merchants and saved the profile information into an electronic database, for example the payment database 195. The program 200 may analyze the merchants' profile information to determine which vulnerability characteristics, if any, are shared between the merchant server 140 and the other merchants.

For each of these other merchants that share at least one of the vulnerability characteristics, the program 200 may calculate a risk score of that merchant being the target of a potential attack, for example an electronic attack that is similar to that experienced by the merchant server 140. If the risk score exceeds a predetermined threshold, the program 200 may perform an action to mitigate the damage of the potential attack. The predetermined threshold may vary, based on various factors such as the type of vulnerability characteristic. For example, a characteristic that is more relevant (i.e., having the characteristic results in a higher likelihood of an attack) may require a lower threshold than a characteristic that is less relevant. The threshold may also vary based on how many characteristics are shared and/or the types of characteristics shared. For example, more characteristics shared may have a lower threshold, and a specific combination of characteristics shared may have a different threshold than another combination even if the number of characteristics is the same (e.g., if one combination shows (through historical data) that an attack is more likely than a different combination). The threshold may also vary based on the merchant. For example, experienced and established merchants may be able to build websites that have better security and less susceptible for being exploited. On the other hand, websites built by smaller and less experienced merchants may be poorly written and thus more susceptible for being exploited. Once the risk score exceeds the threshold, the program 200 may send warnings to the merchant, the acquirer host 165, and/or the issuer host 168 regarding the possibility of an impending attack, so that these entities may prepare for such attacks, and/or take steps to correct the vulnerabilities that make the merchant prone to such attacks. The program 200 may also temporarily deny the transactions involving the merchant until the vulnerabilities have been fixed.

It is understood that although the embodiment of FIG. 1 illustrates the program 200 as residing on the payment provider server 170, this is not intended to be limiting. In some embodiments, the program 200 (or a similar tool) may be implemented on a computer of the acquirer host 165 or on a computer the issuer host 168 as well. In other embodiments, the program 200 may be divided in parts, with some parts being implemented on the payment provider server 170, while other parts are implemented on the merchant server 140 and/or the acquirer host 165 or issuer host 168. Furthermore, although the program 200 is illustrated as being separate from the transaction processing application 190 in the embodiment shown in FIG. 1, the transaction processing application 190 may implement some, or all, of the functionalities of the program 200 in other embodiments. In other words, the program 200 may be integrated within the transaction processing application 190 in some embodiments. The features and functionalities of the program 200 will be discussed later in more detail with reference to FIGS. 2-6.

Still referring to FIG. 1, the payment network 172 may be operated by payment card service providers or card associations, such as DISCOVER™, VISA™, MASTER-CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
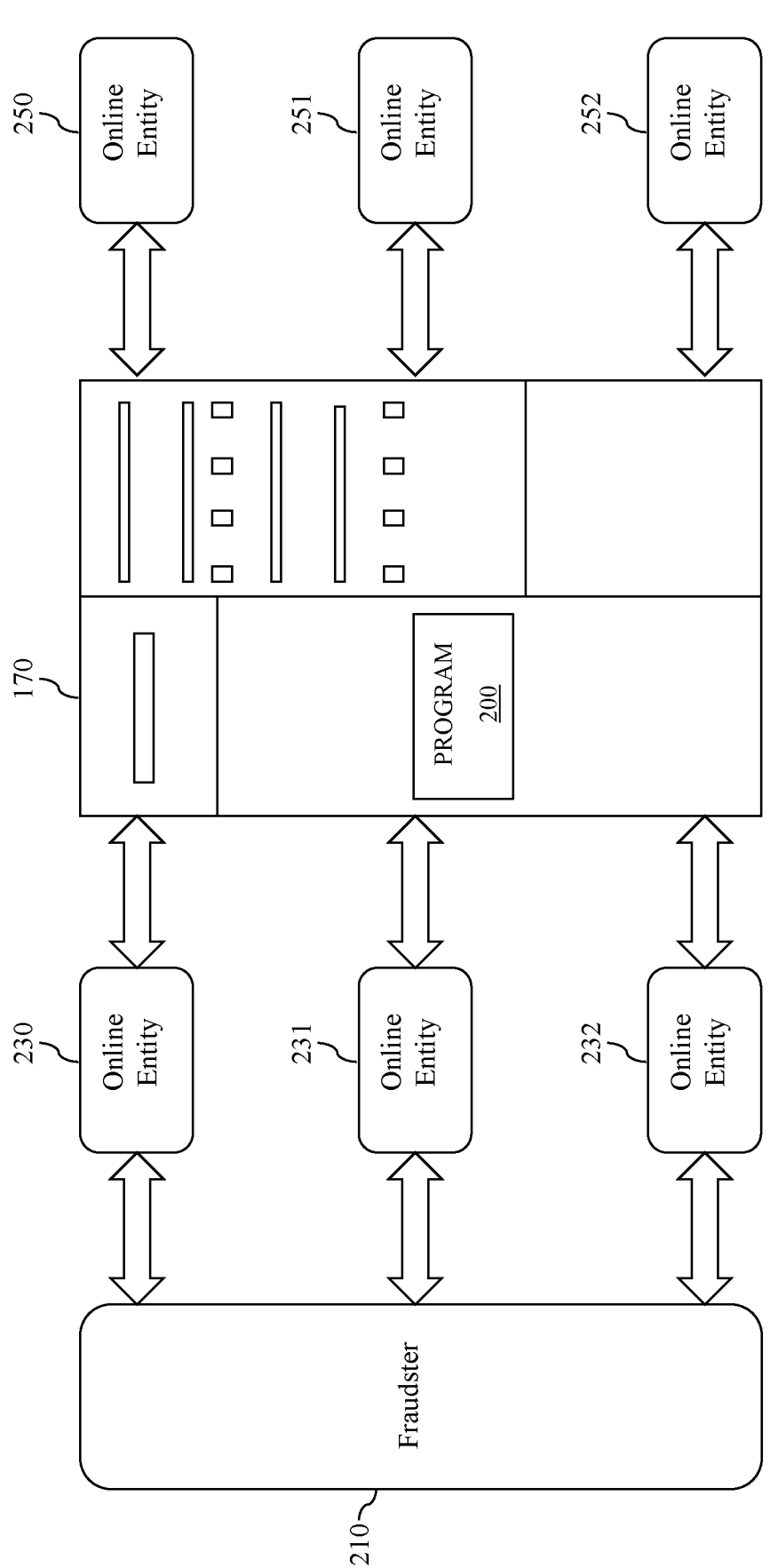
FIG. 2 is a block diagram that illustrates interactions between various entities according to various aspects of the present disclosure.

FIG. 2 is a simplified block diagram illustrating the interactions between various entities according to aspects of the present disclosure. The block diagram in FIG. 2 includes a fraudster 210. The fraudster 210 may include a carder, for example an entity who buys, sells, and/or trades online credit card data stolen from phishing sites or from large data breaches at retail stores. The fraudster 210 may also be engaged in credential stuffing, which are cyber-attacks where stolen account credentials such as usernames/email addresses and the corresponding passwords (often from a data breach) are used to gain unauthorized access to user accounts through large-scale automated login requests directed against a web application. In an example credential stuffing attack, a python script is used to automate the login attempts for a large number of previously discovered credential pairs. The carding and/or credential stuffing attacks are problems that specifically arise in a computer networking context and did not exist prior to the advent and popularization of computer and electronic networking technologies. For example, implementing such a large scale attack with thousands (or more) of credentials would not have been possible using pen and paper alone or in a human's mind, as such an attack requires sending information over electronic networks, and in some cases, virtual machines or other automation tools.

The fraudster 210 may be a single entity or may include a plurality of entities that either act individually or act at least in part in unison. In order to perpetrate the attacks, the fraudster 210 may use a computing tool such as a laptop computer or a desktop computer. In many cases, the computing used by the fraudster 210 is running one or more virtual machines, which may include programs that emulates a legitimate user device, such as a user's laptop or desktop computer, or a user's mobile device. The virtual machine may include specialized software, hardware, or a combination thereof, to provide the functionalities of the actual physical device. The virtual machine(s) may each emulate one or more user devices such as the user device 110 of FIG. 1, so that the fraudster 210 can pretend to be one or more real users who would like to engage in legitimate transactions with other online entities such as merchants.

The block diagram of FIG. 2 further includes a plurality of online entities, for example online entities 230-232. It is understood that although three such online entities 230-232 are shown in FIG. 2, they are merely examples, and that the aspects of the present disclosure may apply to many more online entities than three, or just one online entity as well. In some embodiments, the online entities 230-232 may include online merchants, for example the merchant server 140 of FIG. 1 (or a similar merchant). These online entities 230-232 have engaged in (or are currently engaged in) transactions with the fraudster 210, where the transactions are indicative of fraud. For example, the transactions with the fraudster may include an unusually large number of user login attempts in a relatively short period of time (e.g., hundreds or thousands of logins per minute).

As another example, information regarding the transactions may indicate that the transactions are originated from one or more virtual machines. Often times, fraudsters such as the fraudster 210 use virtual machines to perpetrate fraudulent activity, because it is less traceable, and also because the fraudsters can emulate a great number of seemingly separate user devices with a virtual machine. As such, the use of virtual machines to conduct transactions may be an indicator that the transaction could be fraudulent. However, it is understood that the use of virtual machines alone is not a 100% reliable indicator that the user is attempting to perpetrate fraud, since some legitimate users may use virtual machines to protect their anonymity. Nevertheless, the use of virtual machines may be factored into the overall determination of whether suspicious activity is taking place.

In some embodiments, the online entities 230-232 may report the suspicious transactions (e.g., the transactions that contain indicators of fraud) to the program 200 of the payment provider server 170. In other embodiments, the program 200 may proactively monitor the transactions engaged by the online entities 230-232 (e.g., by electronically scanning the data pertaining to the transactions) to determine the presence of suspicious activity.

Regardless of how the suspicious activity is detected, its occurrence indicates a first electronic attack against the online entities 230-232. In response to receiving or determining the occurrence of the first electronic attack, the program 200 may determine one or more vulnerability characteristics of the online entities 230-232 and analyze the profile information saved in a database pertaining to online entities 250-252 to determine which vulnerability characteristics (if any) are shared between the online entities 230-232 and 250-252.

In some embodiments, the shared vulnerability characteristic may be measured in terms of a distance in a search engine query between multiple members of the online entities 230-232 and 250-252. As an example, a query term of "top ten electronics shops in UK" may be performed using a search engine such as GOOGLE™ to return results will include sites that show their top X lists. If two or more of the online entities 230-232 and 250-252 appear on the same list, then these entities may be deemed to be related or connected. In other words, the search query distance between the entities that appear on the same list may be deemed sufficiently low to meet a predefined threshold, whereas the search query distance between the entities that do not appear on the same list may be deemed sufficiently high to not meet the predefined threshold. In some embodiments, the search engine itself may give a ranking of the relevance of the search term. The closer the online entities 230-232 and 250-252 appear to each other on the ranking, the closer their search engine query distance is deemed to be. In that case, the predefined threshold for the search engine query distance may be measured in terms of the number of spots in the ranking. For example, suppose that the online entity 230 occupies the number 1 spot in the search engine query ranking, and the online entity 250 occupies the number 5 spot in the search engine query ranking. As such, the online entities 230 and 250 are separated by 4 spots. If the predefined threshold distance is 5, then the online entities 230 and 250 are deemed to have met the search engine query distance threshold, which means that they share certain vulnerability characteristics.

It is understood that the search engine query distances between various members of the online entities such as the online entities 230-232 and 250-252 may have already been gathered by the program 200 and saved in an electronic database. Since this information is readily available, once the online entities 230-232 are determined to have undergone (or are undergoing) the first electronic attack, the program 200 may quickly identify which other online entities (e.g., one or more of the online entities 250-252) share vulnerability characteristics with the online entities 230-232 and maybe more likely to be the target of an upcoming second electronic attack.

In some other embodiments, the shared vulnerability characteristic may be determined by electronically scanning the source code of the websites of the online entities 230-232 and 250-252. For example, prior to the indication of the first electronic attack is received or determined, the program 200 may have already electronically scanned the websites of a plurality of online entities that include the online entities 230-232 and 250-252. By examining the source code of the websites, the program 200 may determine information such as whether the scanned website contains electronic links to other websites or has anti-fraud or security protection mechanisms implemented therein.

Figure 3:
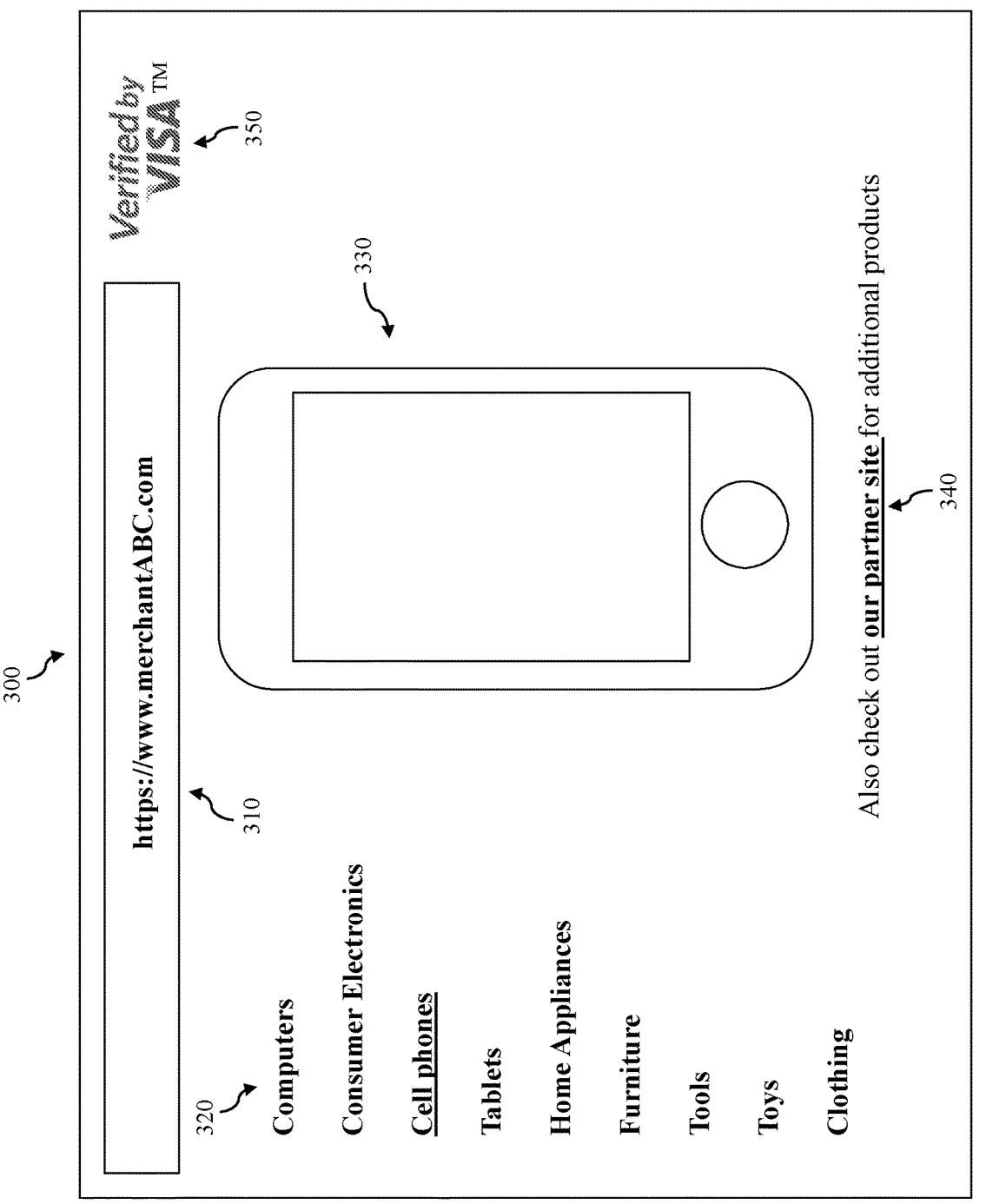
FIG. 3 is an example website of an online entity according to various aspects of the present disclosure.

For example, FIG. 3 illustrates a simplified example screen of a website 300 of an online merchant. The merchant may be one of the online entities 230-232. The website 300 may contain a Uniform Resource Locator (URL) 310, which is www.merchantABC.com in this example. The website

300 may offer a plurality of categories 320 of goods for sale, such as computers, consumer electronics, cell phones, tablets, home appliances, furniture, tools, toys, and clothing, etc. When a user clicks on each category, products offered in that category are displayed. For example, an APPLE IPHONE™ 330 is displayed when the user clicks on the cell phones category.

The website 300 may also contain one or more electronic links to other websites. For example, as shown in FIG. 3, the website 300 includes an electronic link 340 to a partner site. The electronic link 340 may include an embedded active URL link, where upon being clicked by a user, directs the user to the website of another merchant referenced by the embedded active URL link. The fact that the website of the other merchant is linked by the website 300 is an indicator that these websites may have similarities and share vulnerability characteristics.

The website 300 may also have implemented an anti-fraud or security protection mechanism 350, which may be provided by a third party in some embodiments, or may be designed and implemented by the owner of the website 300 in other embodiments. As an example, the anti-fraud or security protection mechanism 350 is Verified by VISA™. As another example, the anti-fraud or security protection mechanism 350 may be Mastercard SecureCode™. In some embodiments, the anti-fraud or security protection mechanism 350 may include an Extensible Markup Language (XML)-based protocol designed to be an additional layer for online credit card or debit card transactions, where the protocol is based on a three-domain model that includes an acquirer domain, an issuer domain, and an interoperability domain. Messages are sent over cryptographic connections for additional security. In some embodiments, the anti-fraud or security protection mechanism 350 may also include a tool (e.g., in Javascript) that can detect whether the user is using a virtual machine to originate and/or conduct transactions with the website 300.

The absence of an anti-fraud or security protection mechanism in a website is a vulnerability characteristic, since it makes the website an attractive target for attacks. Nevertheless, even the presence of a particular anti-fraud or security protection mechanism may still be considered a vulnerability characteristic in some cases. For example, the particular anti-fraud or security protection mechanism may have a security loophole or a bug that has been discovered and exploited by fraudsters. This may lead to a number of attacks against online entities that has implemented such an anti-fraud or security protection mechanism, which means that any website that has implemented this particular anti-fraud or security protection mechanism may also be a target for a future attack. Since the source code of the website 300 typically resides on a web server, it is understood that the source code scanning carried out by the program 200 may be directed to the web server that hosts the website 300 in order to make the determinations discussed above.

Below are some example lines of computer code for searching electronic links on a web page:

```
var urlRegex = /(https?:\/\/[^\s]+)/g;
var str = <here comes website html>
var result;
var1 links = [ ];
while ( ( result = urlRegex.exec(str)) ) {
    links.push(result.index);
}
```

Below are some example lines of computer code for detecting the presence of anti-fraud or security protection mechanisms:

```
//Finding Norton secured banner in website html
var nortonRegex = /Norton Secured - powered by Verisign/g;
var str = <here comes website html>
var result;
result = nortonRegex.exec(str)
if (result != null){
//we found Norton secure in website
}
```

The above code searches for a "Norton Secured" banner on a merchant's website. If the search indicates that the website is using Norton Secure™ (a type of security protection mechanism provided by Norton™), it can be concluded that the website has implemented this particular type of anti-fraud or security protection mechanism. Similarly, a search may be done on the transaction page of a merchant's website for Verified By Visa™, which is another type of anti-fraud or security protection offered by VISA™. Other techniques for electronically scanning the websites of merchants for information may include port scanning or active probing.

Referring back to FIG. 2, the program 200 can detect the presence or absence of electronic links and/or the presence or absence of anti-fraud or security protection mechanisms in the website 300. Again, the electronic scanning may have been performed before the first electronic attack against the online entities 230-232 has occurred. Since the information regarding the electronic links and/or the anti-fraud or security protection mechanism is readily available, once the online entities 230-232 are determined to have experienced the first electronic attack, the program 200 may quickly identify which other online entities (e.g., one or more of the online entities 250-252) share vulnerability characteristics with the online entities 230-232 and are more likely to be the target of an upcoming second electronic attack. For example, the online entities 250-252 may be linked by the online entities 230-232 in some embodiments, or they may lack one or more particular anti-fraud or security protection mechanisms (just as the online entities 230-232 lack them).

In some other embodiments, the shared vulnerability characteristic may pertain to the type/category/value of goods offered for sale by the online entities. For example, fraudsters can prefer goods that are in popular demand and have a high monetary value (e.g., consumer electronics). As such, if two online entities both offer the same type/category of goods that are in the same monetary value range, these online entities may be deemed to share vulnerability characteristics. The type/category/value of goods offered by online entities may be determined via search engine queries.

In yet other embodiments, the shared vulnerability characteristic may pertain to the type of payment accepted by the online entities. For example, a particular payment type accepted by multiple online entities may be an electronic check transaction, or a credit card transaction, or payment via a third party payment provider such as PayPal™, etc. If multiple merchants that all accept a particular type of payment have been electronically attacked, the capability to accept that type of payment may be a vulnerability characteristic, and thus any other online entity that also accepts that particular type of payment may also be a potential target for future attacks.

In yet other embodiments, the shared vulnerability characteristic may pertain to the type of platform supported by the online entities. For example, multiple merchants may support the Magento™ Ecommerce platform, which provides online merchants with a flexible shopping cart system, as well as the control of the look, content, and functionality of the merchant's online store. Thus, a "platform" may refer to one or more particular software package installed on one or more computer systems, and can include hardware characteristics of those systems as well—e.g., particular systems running particular software may have various vulnerabilities based on either the software, the hardware, or a combination thereof. If multiple merchants that all support a particular type of platform have been electronically attacked, that may be an indication that the fraudsters have discovered and exploited security problems in the particular type of platform. As such, the capability to support that type of platform may be a vulnerability characteristic, and thus any other online entity that also supports that particular type of platform may also be a potential target for future attacks. In addition to platforms, the same rationale may apply to specific applications running on a web server as well. In some embodiments, the type of platforms or applications running on a web server may be determined using Google Dork queries, which include search strings that uses advanced operators to find information that is not readily available on a website. Below are some example Google Dork queries for finding specific vulnerable applications running on a web server:

intext:"Powered by phpSQLiteCMS"|intitle:"php-SQLiteCMS—A simple & lightweight CMS"

intitle: "SQLiteManager"+intext:"Welcome to SQLite-Manager version"

In yet further embodiments, the shared vulnerability characteristic may pertain to whether the online entities tolerate an inconsistency between a shipping address and a billing address of a buyer. Generally, an inconsistency between the shipping and billing addresses provided by a buyer may indicate potential fraud, since a fraudster can use stolen credit card information (e.g., containing the billing address) to purchase goods and ship them to an address different from the credit card owner's address. If an online entity that tolerates such an inconsistency has been attacked, then the tolerance of this inconsistency may be a vulnerability characteristic, and thus any other online entity that also tolerates such an inconsistency may also be a potential target for future attacks.

Based on the above discussions, it can be seen that multiple online entities can be clustered or grouped together based on their similarities, such as their shared vulnerability characteristics. The program 200 may then identify online entities (e.g., the online entities 250-252 of FIG. 3) that are likely to be targets of future electronic attacks. The future electronic attacks may have an attack vector or a mode of attack in common with the initial electronic attack against the online entities 230-232. For example, the attack vector or the mode of attack may be based on an exploitation of the same vulnerability characteristic shared by the online entities 230-232 and 250-252, such as the lack of a particular anti-fraud or security protection mechanism, or the offering of high priced electronics for sale, or running the same platform or application known to have security problems, etc.

As discussed above, the program 200 may also calculate a risk score for each of the online entities 250-252 for being a potential target of a future electronic attack. The risk score may include several components, for example a different component corresponding to each shared vulnerability characteristic. If the overall risk score exceeds a predetermined threshold, the program 200 may identify the online entity as a target for a potential attack.

After the online entities (e.g., the online entities 250-252) that are likely to be targets of future electronic attacks are identified, the program 200 may perform one or more actions to mitigate the damage of the potential electronic attack. In some embodiments, the program 200 may send warnings to the online entities 250-252 of a potential electronic attack. In other embodiments, the program 200 may temporarily deny or disable transactions involving the online entities 250-252, until the vulnerabilities of the online entities 250-252 have been addressed or corrected. In further embodiments, the program may provide suggestions or fixes specific to the type of potential electronic attack, which can be based on what online entities 230-232 did after being attacked. Mitigation actions may further include enforcement of particular protocols with regard to affected or potentially affected computer systems. For example, an online entity (e.g. one or more computer systems) may be required by a payment provider to change the way payments are accepted for online transactions-e e.g., a website that ordinarily allows purchases to be shipped to an address that does not match the home billing address for a credit card (which is used to fund the transaction) may be required to suspend this policy, and instead require that all shipments be sent to home billing addresses for a funding instrument. Such a suspension may vary in length (e.g. temporary for minutes, hours, days, weeks, or longer, or permanent or semi-permanent until one or more factors are met such as upgrading security vulnerabilities). Other mitigation actions can include enforcement of other limitations by a payment provider and/or other entity, for example only transactions below a threshold amount (e.g. $50) might be allowed for a particular time period, or transactions above a threshold amount might only be allowed for shipping addresses in certain countries or geographic regions but not others (or might only be allowed if shipping address is the same as billing address). Step-up authentication could also be required for a particular time period, especially if a transaction includes certain types of items and/or is above a threshold limit—such authentication might require two-factor authentication for the purchaser, a phone call to verify details, or other actions.

It is understood that although FIG. 2 illustrates just one program 200 for execution on the payment provider server 170, this is not intended to be limiting. In other embodiments, the server 170 may cause multiple programs 200 (or multiple scripts within the program) to be executed, where each program is configured to determine and/or analyze a different vulnerability characteristic.

Referring now to FIG. 4, a flowchart of a method 400 is illustrated. The method 400 describes an example process flow to predict online entities that may be the target of a potential electronic attack. It is understood that at least one of the steps of the method 400 is performed using one or more hardware electronic processors.

The method 400 includes a step 410 to receive an indication that a first online entity has undergone, or is undergoing, a first electronic attack made by one or more actors engaged in online actions with the first online entity that are indicative of fraud.

The method 400 includes a step 420 to determine, responsive to the indication of the first electronic attack, one or more vulnerability characteristics of the first online entity that are associated with the first electronic attack.

The method 400 includes a step 430 to analyze a plurality of other online entities to identify a second online entity that shares at least one of the vulnerability characteristics with the first online entity.

The method 400 includes a step 440 to predict, based on the determining step 420 and/or the analyzing step 430, that the second online entity is a potential target for a second electronic attack having an attack vector in common with the first electronic attack that corresponds to the at least one of the shared vulnerability characteristics.

The method 400 includes a step 450 to perform an action to mitigate potential damage of the second electronic attack.

In some embodiments, the method 400 may further include steps that are performed before the first electronic attack occurred. These steps may include a step of gathering information from a plurality of online entities that include the first entity and the second entity, as well as a step of saving the gathered information in an electronic database.

In some embodiments, the gathering comprises of conducting search engine queries based on each of the plurality of online entities and calculating query distances between the online entity on which the search engine query was conducted and other online entities. The saving comprises saving the calculated query distances in the electronic database. The determining the one or more vulnerability characteristics comprises retrieving the saved query distances from the electronic database. The analyzing comprises identifying the second online entity in response to a query distance between the first online entity and the second entity being less than a predefined threshold.

In some embodiments, the gathering comprises electronically scanning source codes of websites of each of the plurality of online entities to determine whether the scanned websites contain electronic links to other websites of other entities. The saving comprises saving results of the electronically scanning in the electronic database. The determining the one or more vulnerability characteristics comprises retrieving the results of the electronically scanning from the electronic database. In some embodiments, the analyzing comprises identifying the second online entity in response to the results indicating that the website of the first online entity contains a link to the website of the second online entity or that the website of the second online entity contains a link to the website of the first online entity.

In some embodiments, the analyzing comprises identifying the second online entity in response to the results indicating that the website of the first online entity and the website of the second online entity both lack a particular anti-fraud or security protection mechanism. In some embodiments, the particular anti-fraud or security protection mechanism comprises a mechanism to detect whether a purported buyer is running a virtual machine to access the website of any of the plurality of the online entities. In some embodiments, the analyzing comprises identifying the second online entity in response to the results indicating that the first online entity and the second online entity both accept a particular payment type. In some embodiments, the analyzing comprises identifying the second online entity in response to the results indicating that the first online entity and the second online entity both offer a particular category of goods that exceed a predefined monetary value. In some embodiments, the analyzing comprises identifying the second online entity in response to the results indicating that the first online entity and the second online entity both allow a shipping address of a buyer to be different from a billing address of the buyer.

In some embodiments, the performing the action to mitigate the damage comprises sending a notification to the second online entity regarding the second electronic attack or temporarily denying transactions involving the second online entity.

It is understood that additional method steps may be performed before, during, or after the steps 410-450 discussed above. However, these additional steps are not discussed in detail herein for reasons of simplicity.

Based on the above discussions, it can be seen that the present disclosure offers advantages over conventional fraud detection methods and systems. It is understood, however, that not all advantages are necessarily discussed in detail herein, different embodiments may offer different advantages, and that no particular advantage is required for all embodiments. One advantage is that the present disclosure can predict the occurrence of potential fraud in an electronic online context. In more detail, a payment or service provider may profile online entities such as online merchants by gathering information from these online entities. The gathered information may include, but are not limited to, search engine query distances of these online merchants from one another, whether these online entities' websites contain links to any other online entities' websites, the presence or absence of particular anti-fraud or security mechanisms implemented by these online entities, the type of goods/services or type of payments accepted by these online entities, whether these online entities tolerate inconsistencies between the shipping address and billing address of a buyer, etc. The gathered profile information is saved into an electronic database.

When fraudsters such as carders launch an electronic attack on one of the online entities, the payment provider may determine one or more vulnerability characteristics of the victim (e.g., the online entity being attacked). The payment provider also analyzes the profile information saved in the database to determine if any other online entity shares the same or similar vulnerability characteristics as the victim. Having similar vulnerability characteristics means that the other online entities may be prone to the same attack vector (or a method or mode of attack) used by the fraudsters to attack the initial victim. As such, the payment provider may be able to predict the next target online entity for a potential future electronic attack. Based on this prediction, the payment provider may perform actions to mitigate the damages of the potential attack, for example by notifying the target online entity of a potential upcoming attack, providing suggestions to address the potential attack, and/or by temporarily denying the transactions involving the next target online entity. Thus, potential electronic attacks against online entities may be thwarted, and financial losses of online entities are minimized. The present disclosure thus implements a solution to a problem that specifically arises in a computer networking context (e.g., the electronic attacks discussed above only occurs via computer networks). The server 170 with the program 200 implemented thereon is an improvement over existing computer technologies. Other advantages may include compatibility with existing systems and low cost of implementation.

Figure 5:
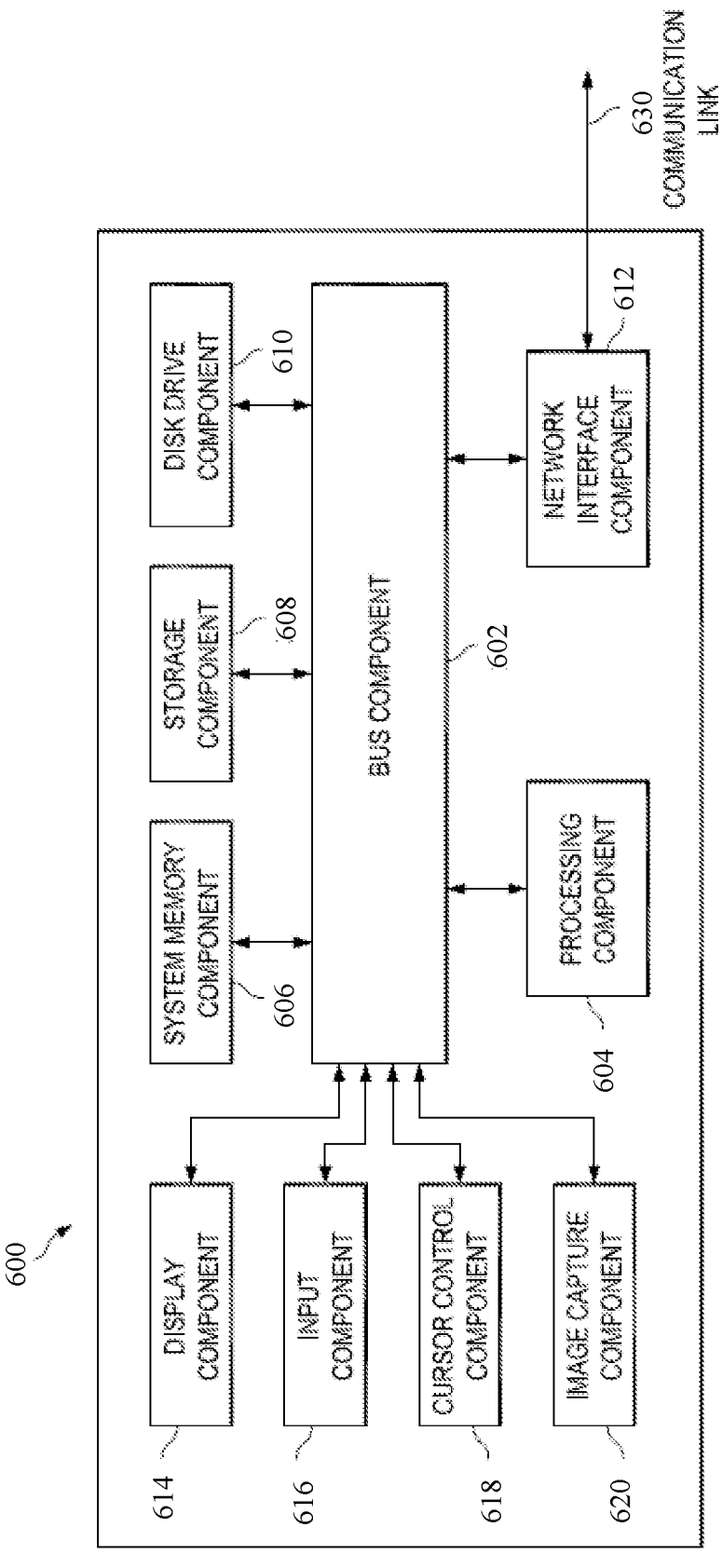
FIG. 5 is an example computer system for implementing the various steps of the methods of FIG. 4 according to various aspects of the present disclosure.

FIG. 5 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6:
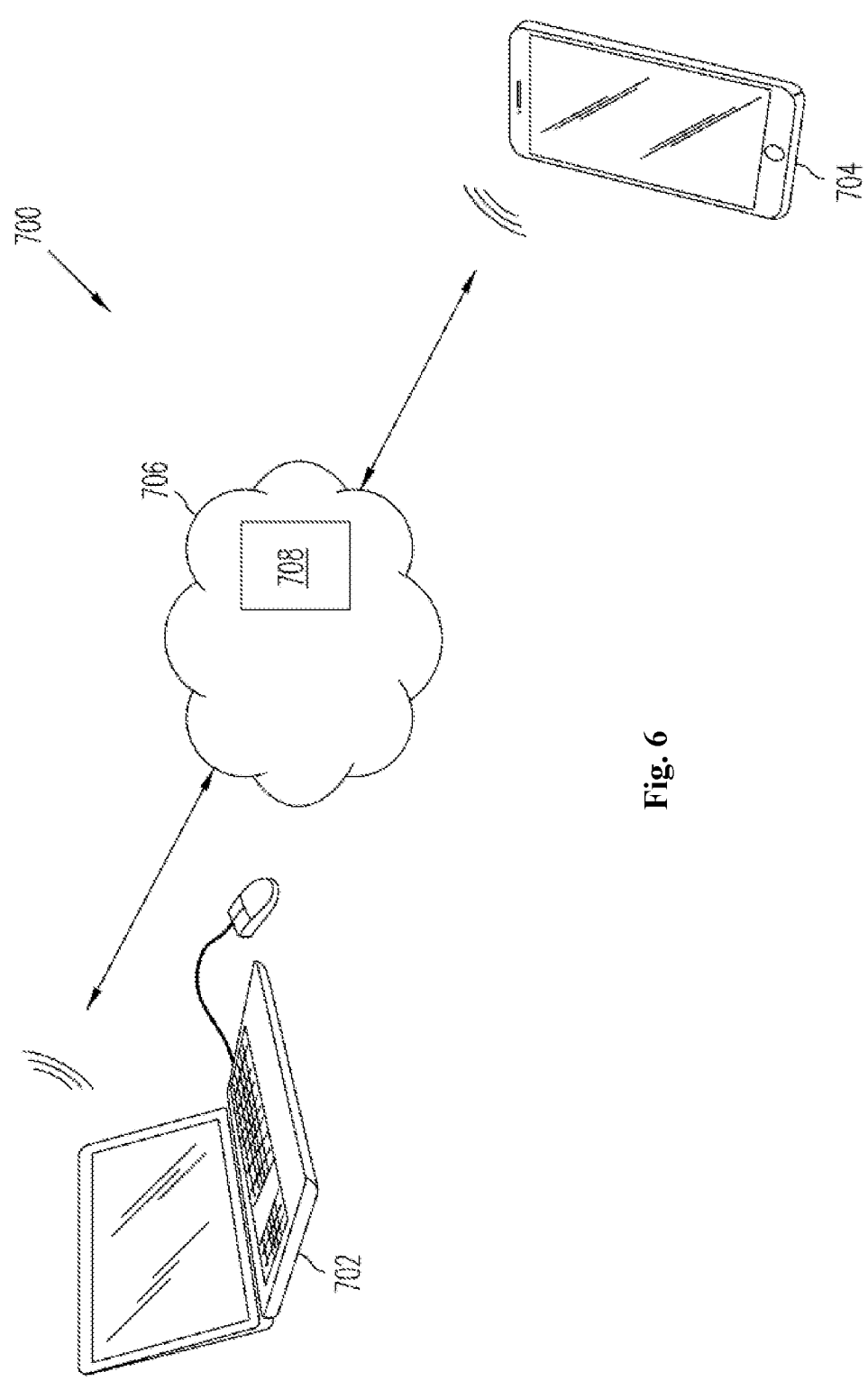
FIG. 6 is a simplified example of a cloud-based computing architecture according to various aspects of the present disclosure.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-5.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. As another example, the mobile device 704 and the cloud-based resources 708 may work together to execute the steps of the method 400 discussed above. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method. The method includes: receiving an indication that a first online entity has undergone, or is undergoing, a first electronic attack made by one or more actors engaged in online actions with the first online entity that are indicative of fraud; determining, responsive to the indication of the first electronic attack, one or more vulnerability characteristics of the first online entity that are associated with the first electronic attack; analyzing a plurality of other online entities to identify a second online entity that shares at least one of the vulnerability characteristics with the first online entity; predicting, based on the determining and/or the analyzing, that the second online entity is a potential target for a second electronic attack having an attack vector in common with the first electronic attack that corresponds to the at least one of the shared vulnerability characteristics; and performing an action to mitigate potential damage of the second electronic attack. At least one of the receiving, the determining, the analyzing, the predicting, or the performing is performed using one or more electronic hardware processors.

One aspect of the present disclosure involves a system. The system includes a non-transitory memory and one or more hardware processors coupled to the non-transitory memory and configured to read instructions from the non-transitory memory to cause the system to perform operations comprising: receiving an indication that a first online merchant has undergone, or is undergoing, a first electronic attack made by one or more actors engaged in online actions with the first online merchant that are indicative of a carding attack or a credential stuffing attack; determining, responsive to the indication of the first electronic attack, one or more vulnerability characteristics of the first online merchant that are associated with the first electronic attack; analyzing a plurality of other online merchants to identify a second online merchant that shares at least one of the vulnerability characteristics with the first online merchant; predicting, based on the determining and/or the analyzing, that the second online merchant is a potential target for a second electronic attack, wherein the first electronic attack and the second electronic attack both exploit the shared vulnerability characteristics between the first online merchant and the second online merchant; and mitigating potential damage of the second electronic attack at least in part by sending a notification to the second online merchant regarding the second electronic attack or temporarily denying transactions involving the second online merchant.

Yet another aspect of the present disclosure involves a non-transitory machine-readable medium having stored thereon machine-readable instructions executable to cause a machine to perform operations comprising: gathering profile information from a plurality of online entities, the profile information including search engine query distances between members of the online entities, links provided by some members of the online entities to other members of the online entities, presence or absence of one or more particular anti-fraud or security protection mechanisms on websites of the online entities, types of goods or values of good offered by the online entities, types of payments accepted by the online entities, shipping and billing address inconsistencies tolerated by the online entities; saving the gathered profile information in an electronic database; receiving an indication that a first member of the online entities has undergone, or is undergoing, a first electronic attack made by one or more actors engaged in online actions with the first member that are indicative of fraud; determining, responsive to the indication of the first electronic attack, one or more vulnerability characteristics of the first member that are associated with the first electronic attack; determining, based at least in part on the profile information saved in the electronic database, that a second member of the online entities shares at least one of the vulnerability characteristics with the first member; predicting that the second member is a potential target for a second electronic attack having an attack vector in common with the first electronic attack that corresponds to the at least one of the shared vulnerability characteristics; and performing an action to mitigate potential damage of the second electronic attack.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:

accessing first information corresponding to one or more first electronic attacks perpetrated by one or more malicious actors against one or more first online entities;

extracting, based on analyzing the first information, one or more characteristics of the one or more first online entities, the one or more characteristics allowing the one or more first online entities to be attacked electronically;

accessing second information associated with one or more second online entities;

identifying, based at least in part on the second information, at least a subset of the one or more second online entities that possess the one or more characteristics, wherein the one or more characteristics comprise: a specified software package supported by the one or more first online entities and the one or more second online entities, or a tolerance of an inconsistency between a shipping address and a billing address by the one or more first online entities and the one or more second online entities; and performing one or more actions that are directed to preventing, mitigating, or remediating one or more second electronic attacks against the subset of the one or more second online entities, wherein the one or more second electronic attacks are the same type of electronic attacks as the one or more first electronic attacks.

2. The method of claim 1, wherein the one or more first electronic attacks comprise a carding attack or a credential stuffing attack.

3. The method of claim 1, wherein the first information comprises an indication that one or more virtual machines were used by the one or more malicious actors to perpetrate the one or more first electronic attacks.

4. The method of claim 1, wherein the second information comprises a search engine query distance between a particular one of the one or more first online entities and a particular one of the one or more second online entities.

5. The method of claim 1, wherein:

the analyzing the first information comprises electronically scanning a source code of one or more first websites of the one or more first online entities;

the accessing the second information comprises electronically scanning a source code of one or more second websites of the one or more second online entities; and the identifying comprises identifying similarities in the source code of the one or more first websites and the source code of the one or more second websites.

6. The method of claim 5, wherein the similarities comprise one or more Uniform Resource Locator (URL) links.

7. The method of claim 5, wherein the similarities comprise a presence or an absence of one or more anti-fraud mechanisms.

8. The method of claim 1, wherein the one or more characteristics comprise a category of goods or services offered for sale by the one or more first online entities and the one or more second online entities.

9. The method of claim 1, wherein the one or more characteristics comprise a type of payment accepted by the one or more first online entities and the one or more second online entities.

10. The method of claim 1, wherein the one or more actions comprise a temporary denial of one or more electronic transactions involving the one or more second online entities.

11. The method of claim 1, wherein the one or more actions comprise transmitting a notification to the one or more second online entities regarding a potential occurrence of the one or more second electronic attacks.

12. A system, comprising:

a non-transitory memory; and one or more hardware processors coupled to the non-transitory memory and configured to read instructions from the non-transitory memory to cause the system to perform operations comprising:

analyzing first information corresponding to one or more previous electronic attacks perpetrated by one or more malicious entities against one or more first online entities;

detecting, based on the analyzing the first information, one or more online vulnerabilities of the one or more first online entities;

analyzing second information associated with one or more second online entities that have not been subjected to the one or more previous electronic attacks;

determining a search engine query distance between a particular one of the one or more first online entities and a particular one of the one or more second online entities;

identifying, based on the analyzing the second information and at least in part on the search engine query distance, that at least a subset of the one or more second online entities share some of the one or more online vulnerabilities of the one or more first online entities;

determining, based on the identifying, that the subset of the one or more second online entities are vulnerable to one or more future electronic attacks from the one or more malicious entities; and performing a preventative action or a remedial action directed to the future electronic attacks.

13. The system of claim 12, wherein:

the first information comprises source code information of one or more first websites of the one or more first online entities;

the second information comprises source code information of one or more second websites of the one or more second online entities; and the one or more online vulnerabilities comprise an absence of a first security protection mechanism on both the first websites and the second websites, a presence of a second security protection mechanism having a specified security loophole on both the first websites and the second websites, or a presence of one or more Uniform Resource Locator (URL) links on both the first websites and the second websites.

14. The system of claim 12, wherein the one or more online vulnerabilities comprise a category of goods or services offered for sale by both the one or more first online entities and the one or more second online entities, a type of payment accepted by both the one or more first online entities and the one or more second online entities, a specified software package supported by both the one or more first online entities and the one or more second online entities, or a tolerance of an inconsistency between a shipping address and a billing address by both the one or more first online entities and the one or more second online entities.

15. The system of claim 12, wherein:

the first information indicates that the one or more previous electronic attacks were perpetrated by the one or more malicious entities using one or more virtual machines; and the determining comprises determining that the one or more second online entities are vulnerable to the one or more future electronic attacks via the one or more virtual machines.

16. A non-transitory machine-readable medium having stored thereon machine-readable instructions executable to cause a machine to perform operations comprising:

accessing first information related to a first type of electronic attack perpetrated by one or more malicious entities against one or more first merchants, wherein the first information comprises information associated with one or more virtual machines used to perpetrate the first type of electronic attack;

identifying, based on the first information, one or more vulnerability characteristics of the one or more first merchants with respect to the first type of electronic attack;

accessing second information associated with one or more second merchants;

determining, based at least in part on a presence of the one or more vulnerability characteristics in the second information, that at least a subset of the one or more second merchants are vulnerable to the first type of electronic attack using the one or more virtual machines and are potential targets of the first type of electronic attack by the one or more malicious entities; and performing one or more actions directed to addressing the first type of electronic attack targeted toward the one or more second merchants.

17. The non-transitory machine-readable medium of claim 16, wherein the first type of electronic attack comprises a carding attack or a credential stuffing attack.

18. The non-transitory machine-readable medium of claim 16, wherein the second information comprises a search engine query distance between a particular one of the one or more first merchants and a particular one of the one or more second merchants.

19. The non-transitory machine-readable medium of claim 16, wherein the one or more vulnerability characteristics are identified further in part based on a source code of one or more first websites of the one or more first merchants and a source code of one or more second websites of the one or more second merchants.

20. The non-transitory machine-readable medium of claim 16, wherein the one or more actions comprise denying one or more electronic transactions involving the one or more second merchants or transmitting a notification to the one or more second merchants regarding a potential occurrence of the first type of electronic attack.

\* \* \* \* \*